July 6, 1954
C. H. MacINTYRE
2,683,001
ACCELERATION RESPONSIVE FLUID PRESSURE
DISTRIBUTION CONTROL SYSTEM
Filed April 30, 1951
3 Sheets-Sheet 1
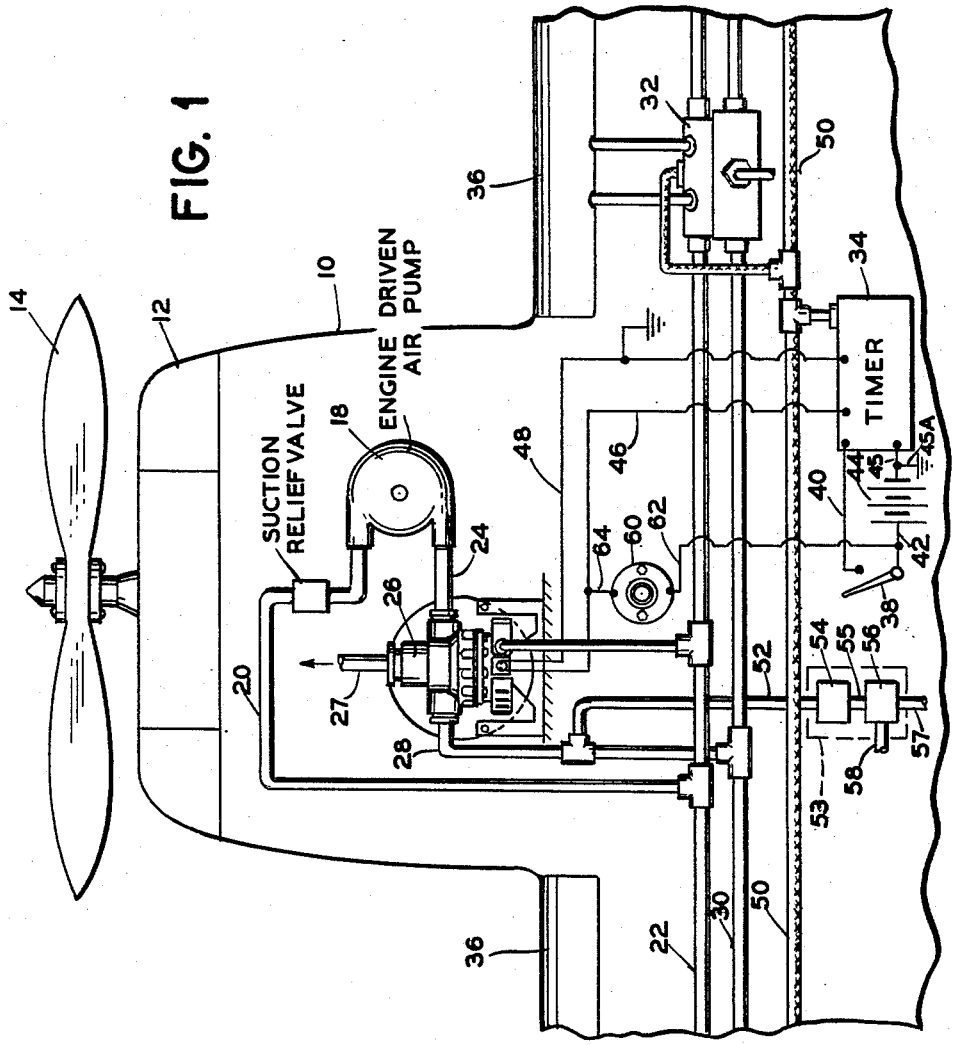
INVENTOR.
CHARLES H. MACINTYRE
BY
Herbert L. Davis Jr.
ATTORNEY

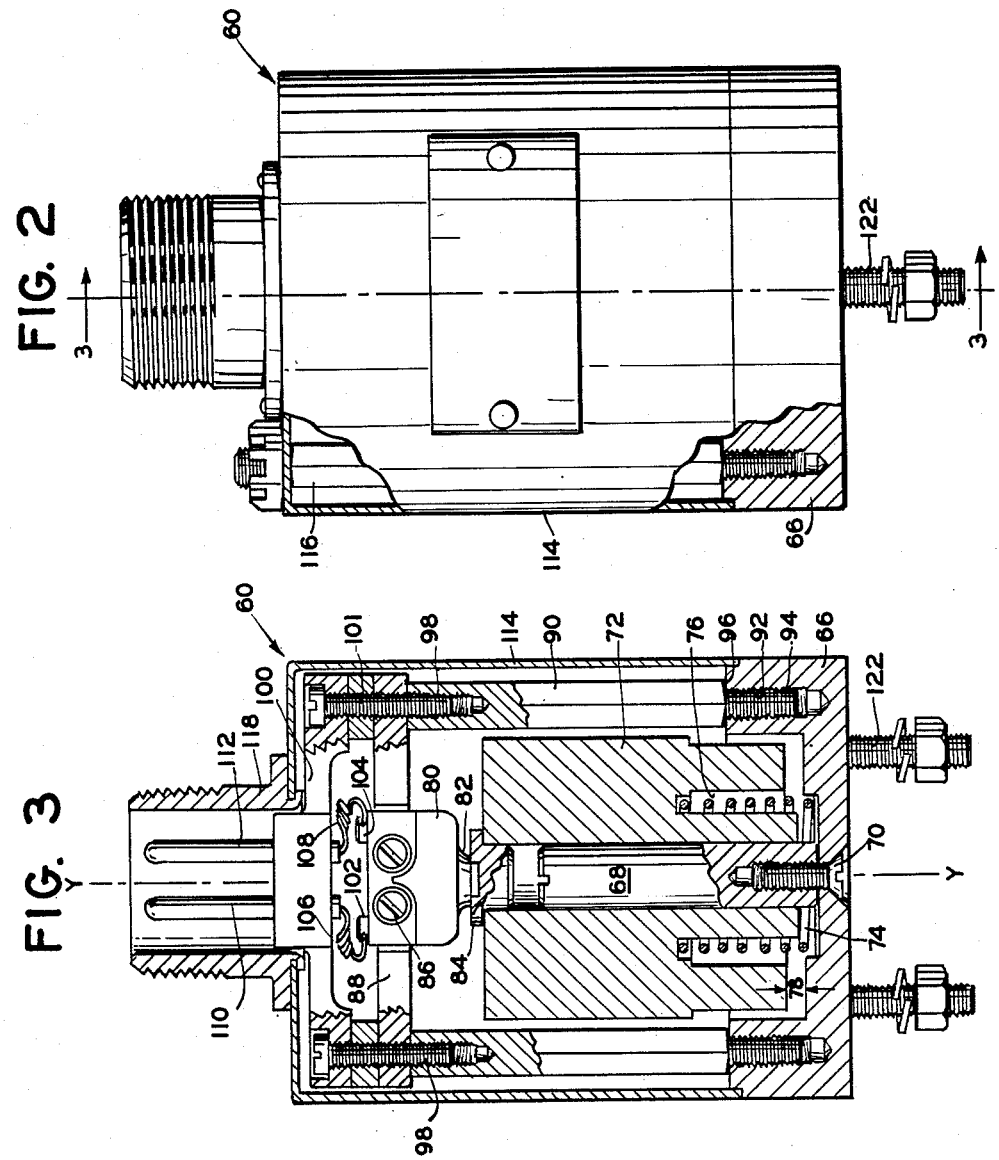

July 6, 1954

C. H. MacINTYRE 2,683,001

ACCELERATION RESPONSIVE FLUID PRESSURE
DISTRIBUTION CONTROL SYSTEM

Filed April 30, 1951

INVENTOR.
CHARLES H. MACINTYRE
BY
Herbert L. Davis Jr.
ATTORNEY

Patented July 6, 1954

2,683,001

UNITED STATES PATENT OFFICE 2,683,001

ACCELERATION RESPONSIVE FLUID PRESSURE DISTRIBUTION CONTROL SYSTEM

Charles H. MacIntyre, Hasbrouck Heights, N. J., assignor to Bendix Aviation Corporation, Teterboro, N. J., a corporation of Delaware Application April 30, 1951, Serial No. 223,735

10 Claims. (Cl. 244—1)

This invention relates generally to fluid pressure distribution systems and more specifically has to do with a novel system whereby an aircraft ice-eliminating system, may be utilized to pressurize or inflate elements of a pressurizable wearing apparel, or "anti-blackout" suit of an aircraft pilot, and to control the operation of the inflatable elements of the ice-eliminating system under conditions of "G" accelerations of the aircraft.

It is well known that a change in the attitude of an aircraft during the flight results in increasing the effect of gravity acting on the aircraft, its components and the pilot or occupants thereof. This increased gravitational effect has been termed "G" acceleration. In instances where the change of the aircraft's attitude occurs rapidly, as for example, in a recovery from a driving attitude, the "G" acceleration resulting therefrom is of a high order and the effect of this high "G" acceleration on the pilot is to cause him to momentarily lose conciousness. To overcome this undesirable effect on the pilot, it has become common practice to equip the pilot with a "G" or anti-blackout suit.

The "G" suit comprises an outer garment such as a coverall, having inflatable elements or bladders therein that are positioned adjacent selected portions of the pilot's body. The bladders are connected to a source of fluid pressure whereby they may be inflated to apply a pressure to the selected portions of the pilot's body. The pressure thus applied retards the flow of blood through the pilot's body to the end that he may withstand relatively high "G" accelerations without losing conciousness. Since it is undersirable to maintain a high pressure in the "G" suit constantly, various "G" acceleration responsive valves have been developed that are adapted to control the delivery of fluid pressure to the "G" suit only in the presence of "G" accelerations in excess of a predetermined magnitude.

Furthermore, it has been found that during periods of "G" acceleration of the aircraft it is highly desirable to deflate the inflatable elements of the ice-eliminating system and to hold them securely against the supporting structure of the aircraft so as to increase the maneuverability of the aircraft during rapid changes in the attitude of the aircraft as in combat.

In the majority of ice-eliminating systems of aircraft, a constantly running pump driven by the aircraft's engine is provided to afford a source or supply of positive and negative fluid pressure. The delivery of these fluid pressures from the pump to the pressure lines or conduits of the ice-eliminating system is normally controlled by solenoid operated valve means, to the end that when the ice-eliminating system is not being used, the valve means operate to discharge the output of positive fluid pressure from the pump to atmosphere rather than to the main pressure manifold or conduit of the system.

In improved ice-eliminating systems, such as is disclosed in co-pending application Serial No. 207,813, filed January 25, 1951, in the name of Harold A. Alexanderson and assigned to Bendix Aviation Corporation, a solenoid valve controls the delivery of the positive fluid pressure as aforesaid, but in addition thereto, when the ice-eliminating system is operative, an electronic timer in the system operates the solenoid valve to deliver positive fluid pressure from the pump to the main fluid pressure distribution line, or manifold, only during the periods in which the inflatable elements or "boots" of the system are being inflated.

Thus, normally during each cycle of operation of the timer there will be a period of time during which fluid pressure will not be delivered to the pressure distribution line, but will be discharged to atmosphere.

The foregoing improved ice-eliminating system also includes a plurality of solenoid operated distributing valve mechanism of the type disclosed in U. S. Patent No. 2,515,519 issued July 18, 1950 to D. M. Lawrence et al. and assigned to Bendix Aviation Corporation. Each distributing valve mechanism is under the control of the timer and operates to connect an inflatable element to either the pressure manifold or the suction manifold to the end that the inflatable elements are periodically inflated and deflated.

Therefore, in order to successfully utilize the fluid pressure available within an ice-eliminating system of the type above set forth for pressurizing a pilot's "G" suit, an acceleration responsive means is provided to override the operation of the solenoid valve by the timer so that the positive fluid pressure from the pump may not be discharged to atmosphere, but is delivered to the main pressure line and made available to inflate the pilot's "G" suit in the event a change of attitude of the aircraft should result in producing an excessive "G" acceleration.

Therefore, the novel system herein provided contemplates the utilization of the positive fluid pressure available in an ice-eliminating system of an aircraft for inflating the "G" suit of a pilot, and embodies means whereby the solenoid operated air discharge valve thereof may be automatically operated in the presence of "G" accelerations to the end that a source of positive fluid pressure capable of inflating the pilot's "G" suit is constantly available.

The novel system contemplated herein also embodies means whereby the solenoid operated air discharge valve of the ice-eliminating system may be operated independently of the electronic timer in the presence of a "G" acceleration.

Another object of the instant invention is to provide means for assuring the prompt delivery of the positive fluid pressure within an ice-eliminating system to a pilot's "G" suit.

The instant invention also contemplates means whereby the inflatable elements or "boots" of an aircraft ice-eliminating system may be deflated in the presence of "G" accelerations.

The instant invention also has for one of its objects the provision of novel means for controlling the solenoid operated distributor valve mechanisms in response to "G" accelerations.

The above and other objects and advantages of the instant invention will appear more fully hereinafter from a consideration of the following description taken together with the accompanying drawings wherein two embodiments of the invention are shown by way of example.

In the drawings:

Fig. 1 is a fragmentary plan view of an aircraft diagrammatically showing the manner in which the novel system contemplated herein for inflating a pilot's "G" suit is associated with an ice-eliminating system of an aircraft;

Fig. 2 is a front view, partially in section, of a "G" acceleration switch forming a part of the system contemplated herein;

Fig. 3 is a section taken along line 3—3 of Fig. 2; and

Figure 4:
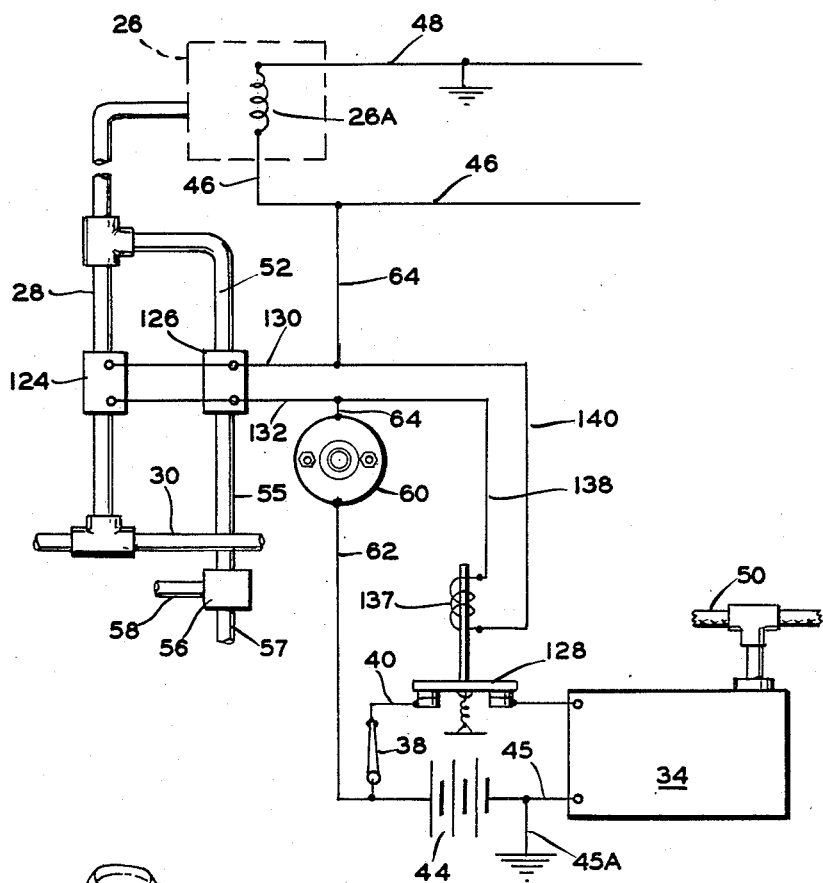
Fig. 4 is a fragmentary view showing a modification of the novel system shown in Fig. 1.

Referring now to the drawings wherein like reference characters designate like parts throughout the several views, in Fig. 1 is shown an aircraft 10 having a power plant or engine 12, a propeller 14 driven thereby, and an ice-eliminating system. The ice-eliminating system per se forms no part of the instant invention and reference is made to the aforenoted application Serial No. 207,813 for a complete description of the construction and operation thereof. As shown in Fig. 1 and for purposes of describing the present invention, the ice-eliminating system comprises a pump 18 adapted to be driven in a conventional manner from the engine 12. The negative pressure or suction side of pump 18 is connected through a conduit 20 and suction relief valve to the main suction line 22, while the positive pressure side thereof is connected through a conduit 24 to the inlet of a pressure unloading valve 26 controlled by a solenoid indicated diagrammatically in Figure 4 by the numeral 26A. The unloading valve 26 may be of the type shown in co-pending application Serial No. 733,960 filed March 11, 1947, in the name of Donald M. Lawrence and assigned to Bendix Aviation Corporation. The fluid discharged from the pump 18 passes to the valve 26 where it is either vented or discharged to atmosphere through vent 27 or passes through a filter unit within the valve 26 and any particles of dirt or other extraneous matter in the fluid is filtered therefrom. The fluid under pressure thus processed is delivered through conduit 28 to a main pressure distribution line or manifold 30.

The main suction and pressure lines 22 and 30, respectively, lead to suitable air distributing valve mechanisms 32 of the type disclosed in the aforenoted Patent No. 2,515,519. A timer 34 effects energization of suitable solenoids controlling the valves 32 in a manner to sequentially operate the inflatable elements or boots 36 carried by the aircraft 10, as described in the U. S. Patent No. 2,515,519.

As hereinbefore set forth, the air distributing valve mechanisms 32 per se form no part of the instant invention and reference is made to the aforenoted U. S. Patent No. 2,515,519 for a detailed description of the construction and operation thereof. For purposes of the instant invention, the valve mechanisms 32 are each provided with suitable solenoid actuated means which solenoids when energized in response to the operation of the timer 34, actuate suitable means to cause the valve mechanisms to pass the positive fluid pressure from the manifold 30 into the inflatable elements 36 to thereby inflate the same. When, due to the operation of the timer 34, the control solenoids of the valves 32 are de-energized, the valves 32 connect the inflatable elements 36 to the negative pressure or suction manifold 22 to the end that the boots 36 are deflated and held against the structure of the wing by the suction in line 22. The timer 34 may be of a type such as described and claimed in the U. S. application Serial No. 207,813.

The operation of the timer 34 and solenoid controlled valve mechanisms 26 and 32 may be directly controlled through operation of a manually operated switch 38 connected to the timer 34 through suitable electrical conductors 40 and 42 leading from one side of a suitable source of electrical energy such as a battery 44. The opposite side of the battery 44 is connected through a conductor 45 to the timer 34. As indicated in Figures 1 and 4 the conductor 45 is grounded at 45A. The timer 34 is electrically associated with the control solenoid of the valve 26 through leads 46 and 48 and with the control solenoids of the valves 32 by an electrical cable 50 and serves to periodically energize such control solenoids from the source of electrical energy 44 as described in the copending application Serial No. 207,813. Thus the opening of switch 38 serves in normal operation to de-energize the timer 34 as well as the control solenoids for the valve mechanisms 26 and 32.

When the switch 38 is closed, the timer 34 operates the valves 26 and 32 through the control solenoids thereof in the manner hereinbefore set forth to actuate the inflatable elements or boots 36. The cycle of operation of the timer 34 may be of any predetermined period of time, for example, the timer 34 may control the valves 32 so as to selectively control the delivery of positive and negative fluid pressure to the boots 36 to inflate and deflate the same in sequence and then, to maintain all of the boots 36 in a deflated condition under suction of the pump 18 for a predetermined period of time. During this latter portion of the timing cycle no positive fluid pressure is normally delivered to the pressure distribution line 30 since the control solenoid for the valve 26 is de-energized through operation of the timer 34 and valve 26 is discharging to atmosphere through the vent line 27, as explained in detail in the aforenoted application Serial No. 207,813.

Figure 5:
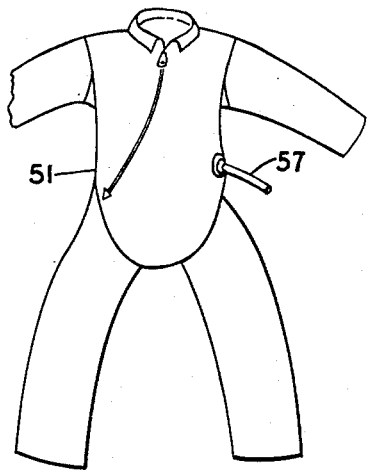
Figure 5 is a fragmentary view illustrating schematically a pilot's G-suit and its operative connection to a fluid pressure conduit.

In order to utilize the positive pressure available from the compressor 18 to inflate the bladders of a pilot's "G" suit indicated in Figure 5 by the numeral 51, a pressure conduit 52 connected to the conduit 28 communicates positive fluid pressure therefrom, to a "G" acceleration responsive valve mechanism indicated generally by the numeral 53 and of a type well known in the art. The mechanism 53 may include a valve 54 having a spring biased weighted valve member which normally closes the conduit 52 to a conduit 55 leading through a pressure regulating valve 56 and a conduit 57 to the inflatable elements of an anti-blackout "G" suit of a conventional type indicated in Figure 5 by the numeral 51. The weighted valve member of the valve 54 is normally biased by a spring into a position closing the conduit 52 and effective under acceleration forces in excess of a predetermined value to automatically open the conduit 52 to conduit 55 for operating the inflatable elements of the anti-blackout "G" suit 51 so as to counter-act the tendency of the blood to pull away from the brain of the pilot under extreme accelerational and centrifugal forces effected during maneuvers of the aircraft.

The pressure regulating valve 56 may be of any suitable type such as shown for example in copending application Serial No. 460,007 filed September 28, 1942, in the name of David Gregg and assigned to Bendix Aviation Corporation and in which there is provided a spring biased relief valve opening from conduits 55 and 57 and normally effective for releasing to atmosphere through an air discharge conduit 58 fluid under excessive pressure and including a weighted member for progressively increasing the pressure setting of the spring and thus the regulated pressure of the inflating pressure in conduit 57 leading to the inflatable elements of the anti-blackout "G" suit with increase in the "G" being exerted upon the pilot so as to apply a counteracting force which increases directly with such accelerational forces.

The valve 56 may be of a conventional pressure regulating type including a bleed or calibrated orifice opening the conduit 55 to atmosphere through the air discharge conduit 58 and a variable orifice opening the conduit 55 into the conduit 57. Such variable orifice in the regulating valve may be controlled by a suitable valve member adjustably positioned by a diaphragm, bellows or other suitable mechanism sensitive to the pressure in the anti "G" suit conduit 57 so as to maintain the pressure therein at a predetermined regulated value sufficient to inflate the inflatable elements of the "G" suit 51 to counter-act the accelerational forces on the pilot upon the "G" valve 54 opening the conduit 52 to the conduit 55. Also upon the "G" valve 54 closing the conduit 52 the inflatable elements in the anti-blackout suit 51 may be deflated by the air under pressure in such elements exhausting through conduit 57, valve 56 and exhaust conduit 58.

As heretofore described, positive fluid pressure is normally delivered through the valve 26 to the conduit 28 only during the time the ice-eliminating system is operating, and then only during the "on" portion of the cycle of the timer 34. In the absence of the applicant's novel "G" switch arrangement should an excessive "G" acceleration occur when the ice-eliminating system is inoperative and the pump 18 is discharging to the atmosphere, there would be insufficient pressure available in the conduit 28 to inflate the pilot's "G" suit 51. Similarly, should the excessive "G" acceleration occur during the "off" portion of the cycle of operation of the timer 34 the positive fluid pressure remaining in the conduit 28 and manifold 30 would be insufficient to inflate the pilot's "G" suit 51.

The instant invention overcomes this difficulty by providing a "G" responsive acceleration switch, generally indicated by the reference character 60, that is adapted to shunt the timer 34 controlling the line 46 in the presence of "G" accelerations in excess of a predetermined value and effect the energization of the solenoid controlling the valve 26 to cause the valve 26 to close the discharge conduit 27 to atmosphere and connect the conduit 24 through the valve 26 to the conduit 28. The "G" acceleration switch 60 is connected through lead lines 62 and 64 to the power source 44 and lead line 46. In the presence of "G" accelerations in excess of a predetermined magnitude, the "G" acceleration switch 60 establishes a circuit from battery 44 through conductors 62, 64 and 46, the control solenoid of valve 26, and grounded conductor 48 for operating the valve 26 to the end that fluid pressure is delivered from the pump 18 to the conduit 28 under such "G" accelerational conditions even though the ice-eliminating system may be inoperative or the timer 34 may be passing through the "off" portion of its cycle.

The "G" acceleration switch 60, shown in detail in Figs. 2 and 3, comprises a cylindrical base or mounting block 66 having a guide post 68 fixedly mounted thereto by a bolt 70. The post 68 is positioned normal to the base 66 and disposed about the vertical axis Y—Y of the switch 60.

The post 68 has slidably mounted thereon a weight or inertia mass 72. A compression spring 74 operatively positioned between the base 66 and the end wall of an annular groove 76 formed in the weight 72 resiliently supports the weight 72 on the post 68 to the end that a clearance 78 is provided between the bottom of the weight 72 and the top of the base 66. Due to the foregoing arrangement, when the switch 60 is mounted in an aircraft with the vertical axis Y—Y thereof normal to the longitudinal and lateral axis of the aircraft as shown in Figure 1, "G" accelerations cause the weight 72 to slide downwardly on the post 68 against the biasing effect on the spring 74. A proper mass of the weight 72 and rate of the spring 74 can be determined by mathematical formulae well known in the art, to the end that the weight 72 moves on the post 68 against the biasing force exerted by spring 74 only in the presence of a "G" acceleration of a predetermined magnitude. Thus, by adjusting the mass of the weight 72 relatively to the rate of the spring 74, the switch 60 can be adjusted to respond to any predetermined "G" acceleration. This movement of the weight 72 in response to a predetermined "G" acceleration is utilized to operate a snap switch 80 carried by the base 66.

The snap switch 80 is provided with a control or push button 82 that operatively engages a cap 84 carried by the weight 72. The snap switch 80 per se forms no part of the instant invention and may be any one of a number well known in the art that are adapted to close, or establish a circuit through the switch, when a force imposed on the control button thereof is removed.

In order to support the snap switch 80 in spaced relationship to the base 66 and in operative relationship to the weight 72, the snap switch 80 is secured by bolts 86 to a mounting plate 88. Support elements 90 externally threaded at 92 to engage the internal threads 94 formed in the base 66, and a shoulder 96 formed on the support elements 90 engages or abuts the base 66 to the end that the element 90 is securely mounted to the base 66. The opposed ends of the supporting elements 90 are internally threaded as at 98. The mounting plate 88 and a yoke 100 of insulation material are securely mounted on the support elements 90 by bolts 101 which pass through openings formed in the mounting plate 88 and yoke 100 adjacent the outer ends thereof and engage the internal threads 98 of the support elements 90. The terminals 102 and 104 of the snap switch 80 are joined by suitable electrical leads 106 and 108 to contacts 110 and 112 carried by the yoke 100.

The foregoing elements of the switch 60 are enclosed within a cup-shaped casing 114 that is mounted to the base 66 by suitable fastening means such as bolts 116. The casing 114 is provided with an externally threaded cylindrical extension 118 adapted to receive an electrical connection plug, not shown, to the end that leads 62 and 64 of Figure 1 are connected to the contacts 110 and 112 respectively.

The base 66 is provided with mounting bolts 122 that afford means of securing the switch 60 to a supporting structure.

It will be apparent to one skilled in the art that when the switch 60 is secured by the mounting bolts 122 thereof, to the structure of the aircraft 10 with the vertical axis Y—Y thereof, normal to the longitudinal and lateral axis of the aircraft 10, as shown in Figure 1, and is connected to the power source 44 and lead 46 through leads 62 and 64, respectively, "G" accelerations in excess of the setting of the switch 60 will cause the weight or mass 72 to slide downwardly on the post 68. The force imposed on the control button 82 by the spring 74 acting through the weight 72 and cap 84 thereof, will be removed and switch 60 will close to establish a circuit from the power source 44, through lead 62, switch 60, leads 64 and 46, the control solenoid of the valve 26 and thence to ground lead 48. This circuit energizes the control solenoid of valve 26 to the end that fluid pressure is delivered from the pump 18 to the conduit 28, conduit 52, and to the "G" valve 54 and regulating valve 56 where it is available to pressurize the pilot's "G" suit 51 as hereinbefore set forth. The valve 54 and switch 60 may be adjusted to operate synchronously in the presence of a predetermined "G" acceleration or the valve 60 may be adjusted to operate at a slightly lower "G" acceleration than the valve 54 to insure the delivery of fluid pressure to the valve 54 just prior to its operation in response to a "G" acceleration. Thus, should an excessive "G" acceleration occur during a time when the ice-eliminating system is inoperative or when the ice-eliminating system is operative and the timer 34 is passing through the "off" portion of its cycle, the switch 60 operates the valve 26, to provide a sufficient source of positive fluid pressure for the pressurization of the pilot's "G" suit 51.

The novel system hereinbefore set forth for supplying the positive fluid pressure from the ice-eliminating system of an aircraft to a pilot's "G" suit 51 may be modified, as shown in Fig. 4, so as to incorporate means for assuring the prompt delivery of positive fluid pressure to the pilot's "G" suit 51 and in addition thereto assuring delivery of negative fluid pressure or suction to all the boots 36, for deflating the boots 36 and for holding them securely against, or in contact with, their supporting aircraft structure during periods when the aircraft structure is subjected to excessive "G" accelerations.

In this modified form of the instant invention, the conduits 28 and 52 are provided with solenoid actuated valves 124 and 126 respectively, and a solenoid actuated relay switch 128 is inserted in the lead 40. The foregoing elements are electrically associated with the switch 60, as will hereinafter be more fully set forth, to the end that positive fluid pressure from the pump 18 is delivered solely to the conduit 55 and the valves 32 are controlled independently of the timer 34 to apply suction to all of the boots 36 whenever the switch 60 is actuated in response to an excessive "G" acceleration. Moreover, since in this modified form the valve 126 serves to supply positive fluid pressure to the conduit 55 only in response to the closing of switch 60 in the presence of excessive "G" accelerations, the valve 54 is not required in the modified system. The valve 56 is retained however, and operates in the manner hereinbefore set forth to deliver a selected positive pressure to the "G" suit 51 and to permit the suit to vent to atmosphere when the pressure therein is no longer required.

The valve 124 that is connected into the conduit 28 is provided with solenoid actuating means that permit fluid pressure to flow through the valve 124 and hence to manifold 30 whenever the solenoid thereof is de-energized, while closing the conduit 28 upon energization of the solenoid thereof. On the other hand, the valve 126, inserted in conduit 52, is provided with solenoid actuating means that close the valve 126 when the solenoid is deenergized to the end that fluid pressure is prevented from flowing through conduit 55 to the valve 56, while opening the conduit 52 upon energization of the solenoid thereof. Thus, the valve 124 is normally open permitting fluid pressure to flow to the manifold 30 and valve 126 is normally closed preventing fluid pressure from being delivered through valve 56 to the "G" suit 51.

The valves 124 and 126 are electrically associated with the switch 60 through leads 130 and 132 that connect the solenoid controlling the valve 124 to the solenoid controlling the valve 126 and the control solenoids in the lead 64 of the switch 60 as shown in Figure 4. Due to this arrangement, when the switch 60 is closed in response to an excessive "G" acceleration, the solenoids controlling valves 124 and 126 are energized causing valve 124 to close and valve 126 to open, at the same time as the solenoid 26A controlling the valve 26 is energized by the closing of the acceleration switch.

In order to control the distributing valves 32 independently of the timer 34, a relay switch 128 normally biased to a closed position and controlled by a solenoid 137 is connected into the lead 40. The solenoid 137 is connected by leads 138 and 140 in the lead 64 of the switch 60. Thus, when the switch 60 is closed in response to an excessive "G" acceleration, the relay switch 128 is actuated by the solenoid 137 to open the lead 40 thereby disconnecting the power source 44 from the timer 34 and the lines of the cable 50 leading to the solenoids controlling the valve mechanisms 32. The solenoid of any of the valves 32 which may have been energized through the timer 34 is thereupon de-energized by the opening of relay switch 128, and as hereinbefore set forth, all of the valves 32 are then operative to connect the boots 36 to the suction line 22 to the end that all the boots 36 are deflated and held against their supporting structure by the suction in the line 22 during the excessive accelerational conditons in the event the pilot should fail to open switch 38.

When the aircraft is in flight and the ice-eliminating system is inactive, due to the opening of switch 38, the positive fluid pressure output of pump 18 is directed by valve 26 to the vent line 27 where it is discharged overboard. The solenoids of the valves 32 are de-energized and therefore, the valves 32 are operative to connect the boots 36 to the suction line 22 to the end that the boots 36 are held securely against their supporting structure, for example, the structure forming the leading edge of the wing. If the ice-eliminating system has been inactive for a long period of time, it is probable that there is little or no positive fluid pressure in the manifold 30 due to the gradual leakage losses occasioned by the relatively long inactivity of the system. On the other hand, the manifold 30 may contain a relatively high value of positive fluid pressure as for example, the pressure that would exist therein immediately after the ice-eliminating system had been de-energized. In either event, should an excess "G" acceleration of the aircraft occur, the response of the switch 60 thereto establishes an electrical circuit from power source 44, through lead 62, the switch 60, lead 64, lead 132, the solenoids controlling valves 124 and 126, lead 130, leads 64 and 46, solenoid 26A controlling valve 26 and lead 48 to ground.

The circuit thus established actuates the valve 26 to direct positive fluid pressure from the pump 18 to conduit 28, the valves 124 and 126 close and open respectively, to the end that fluid pressure is directed solely through the conduit 55 to the valve 56 from whence it is delivered to the pilot's "G" suit 51 for the immediate operation thereof under the excessive "G" accelerational conditions, although operation of the ice-eliminating system has been discontinued.

In the event the inflatable ice-eliminating system is in normal operation, the switch 60 in response to excessive accelerational conditions also establishes a circuit through lead 138, the solenoid 137 to open relay switch 128 and leads 140, 64, and 46 to the solenoid 26A of valve 126 and lead 48 to ground. The closing of switch 60 thus also energizes the solenoid 137 controlling the relay switch 128 to thereby disconnect the electrical power source 44 from the timer 34 and the control cable 50 to the end that the solenoids controlling the valves 32 are all de-energized and the boots 36 are connected to the suction line 22. Thus, the switch 60 is operative through this circuit to establish a control over the valves 32 that is independent of the operation of the timer 34. Moreover, the control over the solenoid actuated valves 32, thus established, is operative in the presence of "G" accelerations in excess of the preset value of the switch 60 to cause all of the boots 36 to be connected to the suction line 22 whereby the boots 36 are deflated and securely held against their supporting structure during the period in which the aircraft is subjected to an excessive "G" acceleration.

It is apparent, that when the "G" acceleration decreases below the presetting of the switch 60, the switch 60 operates to open the foregoing circuits thereby restoring the normal operation of the system. Thus, in the event the switch 38 is open, the valve 26 will be operative to discharge the output of positive fluid pressure from the pump 18 through vent 27, while if the switch 38 is closed, the timer 34 will once more be placed in control of the operation of the valves 26 and 32 as hereinbefore set forth.

From the foregoing description of the structure and operation of the present invention, it will be apparent to one skilled in the art, that a novel fluid pressure system for the pressurization of a pilot's "G" suit is provided in which the several objects of the instant invention have been achieved.

Moreover, it is apparent that the novel system herein proposed is capable of modification to the end that the prompt delivery of positive fluid pressure to the "G" suit, and the deflation of all of the boots of the ice-eliminating system are assured during periods in which the aircraft is subjected to excessive "G" accelerations.

While only two embodiments of the present invention have been illustrated and described, various changes in the construction and arrangement of parts may be made by one skilled in the art, without departing from the scope of the invention.

I claim:

1. In a fluid pressure distribution system adapted for use in an aircraft and including a source of fluid pressure, valve means controlling delivery of said fluid pressure to a manifold, and a timer controlling the operation of said valve means; the combination with said valve means and timer of "G" acceleration responsive means operatively connected to said valve means and operative in response to "G" accelerations of the aircraft to bypass said timer and render said valve means effective to deliver fluid pressure medium to said manifold independently of said timer.

2. In a fluid pressure distribution system adapted for use in an aircraft and including a source of fluid pressure and electrically operated valve means for controlling delivery of said fluid pressure to a manifold of the system, the combination with said valve means of "G" acceleration responsive means, and means electrically connecting said "G" acceleration responsive means to said valve means whereby said "G" acceleration responsive means operates said valve means to deliver fluid pressure to said manifold in response to "G" accelerations of the aircraft.

3. The combination with the ice-eliminating system of an aircraft including a source of fluid pressure, and a solenoid operated valve controlling the delivery of said fluid pressure to a manifold of said system, of means to deliver fluid pressure to a "G" suit, said means comprising a normally open solenoid operated valve in said manifold, a conduit connected to said manifold between said normally open solenoid valve and the first-mentioned solenoid operated valve controlling the delivery of fluid pressure from said source, a normally closed solenoid operated valve in said conduit, and means responsive to "G" accelerations of said aircraft for controlling said first-mentioned solenoid operated valve to deliver fluid pressure to said manifold and simultaneously closing said normally open solenoid operated valve and opening said normally closed solenoid operated valve to deliver fluid pressure from said source of fluid pressure through said conduit to the "G" suit.

4. The combination with an aircraft ice-eliminating system including a source of fluid pressure, first valve means controlling delivery of fluid pressure from said source to a manifold of the system; of means for controlling delivery of fluid pressure from said manifold to an acceleration responsive control valve for a pilot's "G" suit; said means comprising normally open second valve means in said manifold, a conduit being connected to said manifold upstream of said normally open second valve means and leading to said control valve, normally closed third valve means in said conduit, and means responsive to "G" accelerations of said aircraft to control the first, second and third valve means aforesaid so as to effect delivery of fluid pressure through said manifold solely to the control valve of the pilot's "G" suit.

5. The combination with an aircraft ice-eliminating system including inflatable elements and means for inflating and deflating the inflatable elements of said system, of acceleration responsive means operatively connected to said first-mentioned means to operate said first mentioned means to deflate said inflatable elements under accelerational conditions of the aircraft in excess of a predetermined value.

6. In an ice-eliminating system for an aircraft of the type including a source of positive and negative fluid pressures, a first conduit connecting the positive fluid pressure from said source to a pressure manifold, an electrically operated control valve in said first conduit for controlling the delivery of positive fluid pressure to said pressure manifold or to a vent conduit, a second conduit connecting the negative fluid pressure from said source to a suction manifold, an electrically operated distributing valve connected to said pressure and suction manifolds, said distributing valve being adapted to selectively deliver positive and negative fluid pressures to an inflatable element of the system, and a timer, said control and distributing valves and timer being associated in an electrical circuit including an electrical power source whereby said timer operates said control and distributing valves to periodically deliver positive or negative pressure to said inflatable element to inflate or deflate the same; the improvement comprising a pressure line for connecting said first conduit to inflatable elements of an anti-blackout suit, normally open electrically operated valve means in said first conduit, normally closed electrically operated valve means in said pressure line, an electrically operated relay switch means adapted to disconnect said timer and distributing valve from said electrical power source, an acceleration responsive switch means responsive to acceleration of said aircraft in excess of a predetermined value, said acceleration responsive switch means being in electrical association with said control valve, said normally open and normally closed valve means, said relay switch means and said electrical power source whereby the response of said acceleration responsive switch means to accelerations of said aircraft in excess of said predetermined value establishes an electrical circuit to operate said control valve to deliver positive fluid pressure to said first conduit, to close and open said normally opened and closed valve means respectively so as to deliver positive fluid pressure to said pressure line, and to operate said relay switch means so as to disconnect said timer from said electrical power source and operate said distributing valve to connect said inflatable elements to said negative pressure manifold.

7. The combination with an aircraft ice-eliminating system including a source of negative fluid pressure, a suction manifold connecting said negative fluid pressure to inflatable elements carried by said aircraft, a distributing valve to control deflation of said inflatable elements under negative fluid pressure in said suction manifold, a timer adapted to control the operation of said distributing valve, and an electrical circuit including an electrical power source for electrically associating said timer to said distributing valve whereby the former operates the latter to periodically connect said distributing valve to said suction manifold; of acceleration responsive means for controlling operation of said distributing valve independently of said timer including a relay switch connected in said circuit between the power source thereof and said timer, and an acceleration responsive switch means electrically associated with and operative in response to acceleration of said aircraft in excess of a predetermined value to operate said relay switch so as to disconnect said timer and distributing valve from the electrical power source of said circuit to cause said distributing valve to connect said inflatable element to said source of negative fluid pressure.

8. The combination with an aircraft ice-eliminating system including a source of fluid pressure, a pressure manifold, a first conduit connecting said fluid pressure to said pressure manifold, a normally open electrically operated valve means controlling the flow of fluid pressure through said first conduit to said pressure manifold, a fluid pressure regulating valve, a second conduit connected into said first conduit upstream of said normally open valve and communicating with said fluid pressure regulating valve, an electrically actuated normally closed valve controlling the flow of fluid pressure through said second conduit, an electrical circuit including an electrical power source connected to said normally open and closed valves for the operation thereof, and an acceleration responsive switch means for controlling said circuit whereby said normally open valve is closed and said normally closed valve is opened in response to the actuation of said acceleration responsive switch by accelerations of said aircraft in excess of predetermined values.

9. In an aircraft's inflatable ice-eliminating system of the type including a plurality of inflatable units, a fluid pressure supply line and a suction line therefor, distributor mechanisms for the units to connect said supply line and said suction line in alternation with the units, and timing means common to the distributor mechanisms for controlling the operation of the distributor mechanisms in alternation; the improvement comprising acceleration responsive means, responsive to accelerational conditions of said aircraft above a predetermined value, and means operatively connecting said acceleration responsive means to said timing means whereby said acceleration responsive means operates said timing means to operate said distributing mechanisms and connect said suction line to all of said units under accelerational conditions of said aircraft in excess of said predetermined value.

10. In an aircraft's inflatable ice-eliminating system of the type including a plurality of inflatable units, a fluid pressure supply line and a suction line therefor, and distributor means for the units to connect said supply line and said suction line in alternation with the inflatable units; the improvement comprising acceleration responsive means, responsive to accelerational conditions of the aircraft above a predetermined value, and means operatively connecting said acceleration responsive means to said distributor means whereby said distributor means is operated to connect said suction line to all of said inflatable units under accelerational conditions of the aircraft in excess of a predetermined value.

References Cited in the file of this patent

UNITED STATES PATENTS

| Number | Name | Date |
|---|---|---|
| 2,379,497 | Sellmeyer | July 3, 1945 |
| 2,495,316 | Clark et al. | Jan. 24, 1950 |
| 2,499,793 | Stearns | Mar. 7, 1950 |
| 2,515,519 | Lawrence et al. | July 18, 1950 |

FOREIGN PATENTS

| Number | Country | Date |
|---|---|---|
| 604,304 | Great Britain | July 1, 1948 |